United States Patent
Jellison, Jr. et al.

(10) Patent No.: US 10,536,443 B2
(45) Date of Patent: Jan. 14, 2020

(54) LICENSING AUTHENTICATION VIA INTERMEDIARY

(71) Applicant: iHeartMedia Management Services, Inc., San Antonio, TX (US)

(72) Inventors: David C. Jellison, Jr., Ogallala, NE (US); Philippe Generali, Scarsdale, NY (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 16/247,742

(22) Filed: Jan. 15, 2019

(65) Prior Publication Data

US 2019/0149533 A1    May 16, 2019

Related U.S. Application Data (63) Continuation of application No. 15/151,578, filed on May 11, 2016, now Pat. No. 10,187,367.

(51) Int. Cl.
| | |
|---|---|
| G06F 21/10 | (2013.01) |
| H04L 29/06 | (2006.01) |
| H04W 12/06 | (2009.01) |
| H04B 1/3827 | (2015.01) |
| H04W 4/80 | (2018.01) |

(52) U.S. Cl.
CPC .............. *H04L 63/08* (2013.01); *G06F 21/10* (2013.01); *G06F 21/105* (2013.01); *H04B 1/3833* (2013.01); *H04L 63/10* (2013.01); *H04W 4/80* (2018.02); *H04W 12/06* (2013.01)

(58) Field of Classification Search
CPC combination set(s) only.
See application file for complete search history.

(56) References Cited

U.S. PATENT DOCUMENTS

| | | |
|---|---|---|
| 7,032,003 B1 | 4/2006 | Shi et al. |
| 7,378,939 B2 | 5/2008 | Sengupta et al. |
| 8,045,961 B2 | 10/2011 | Ayed et al. |
| 8,646,060 B1 | 2/2014 | Ben Ayed |
| 2005/0148322 A1 | 7/2005 | Jei |
| 2008/0066181 A1 | 3/2008 | Haveson et al. |
| 2011/0055901 A1 | 3/2011 | Karaoguz et al. |
| 2012/0255026 A1 | 10/2012 | Baca et al. |
| 2016/0309203 A1 | 10/2016 | Gonzalez |
| 2017/0163645 A1 | 6/2017 | Bradley et al. |

OTHER PUBLICATIONS

Klosowski; Tether Locks and Unlocks your Mac Automatically with your iPhone; Mar. 11, 2015; 2 pgs, downloaded from internet Mar. 7, 2016 [http://lifehacker.com/tether-locks-and-unlocks-your-mac-automatically-with-yo-1690802726].

*Primary Examiner* — Minh Dinh
(74) *Attorney, Agent, or Firm* — Garlick & Markison; Kelly H. Hale (57) ABSTRACT

A client device can wait for an intermediary device to open a licensing window before transmitting a licensing request to the intermediary device. The intermediary device transmits the licensing request to an authentication server, which responds by transmitting a message indicating approval status of the request back to the intermediary device. The client device receives, from the intermediary device, a licensing response reporting the approval status indicated by the message from the authentication server. The client device communicates with the intermediary device via one network, while the intermediary device communicates with the authentication server via a different network.

18 Claims, 7 Drawing Sheets

FIG.7

LICENSING AUTHENTICATION VIA INTERMEDIARY

CROSS REFERENCE TO RELATED PATENTS

The present U.S. Utility patent application claims priority pursuant to 35 U.S.C. § 120 as a continuation of U.S. Utility application Ser. No. 15/151,578, entitled "LICENSING AUTHENTICATION VIA MOBILE DEVICE," filed May 11, 2016, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to licensing authentication and more particularly to delivering licensing authentication messages.

2. Description of Related Art

Conventional licensing authentication techniques often require a computer, tablet, or other device to exchange licensing authentication messages with a remotely located authentication server via the Internet. For example, enterprise-level software may require verification of licensing permission prior to allowing execution of the software. Similarly, various media items can be locked using any of various content protection schemes that require verification of a media license before allowing the media item to be presented to a user. Additionally, many newer media devices are manufactured to be compliant with content protection schemes, such as High-bandwidth Digital Content Protection (HDCP), which use key revocation and other techniques that can prevent a device from receiving or transmitting media items without proper authorization.

Without Internet connectivity to enable communication with the licensing server, however, access to various software media items may not be possible, because licensing messages cannot be exchanged with the licensing server.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

DETAILED DESCRIPTION OF THE INVENTION

In various embodiments, a mobile device can access the Internet via a cellular communication network using various techniques and standards such as, but not limited to, Time Division Multiple Access (TDMA), Code Division Multiple Access (CDMA), Wideband Code Division Multiple Access (WCDMA), Global System for Mobile communication (GSM), Third Generation (3G), Long Term Evolution (LTE) or Fourth Generation (4G) network provided by any of various communication carriers, or through a local area network (LAN) connected to the Internet or another wide area network (WAN). The mobile device can also include a personal area network (PAN) interface enabling, among other things, Bluetooth® technology. A computer, tablet, or other device running software or accessing media that requires communication with a licensing authentication server can establish communication with the mobile device via the PAN, and the mobile device can manage licensing messages and responses between the device and the licensing server.

PAN communications can be established automatically when the mobile device comes within a proximity threshold of the device requiring licensing authentication. In some embodiments, the mobile device will forward licensing messages between the device and the licensing server only during a specified window of time, even if the mobile device and the device requiring licensing authentication are within the proximity threshold. The mobile device can, in some embodiments, temporarily store communications from the licensing server or the device requiring licensing authentication, even if the window is closed because the mobile device is outside the proximity threshold, or if the mobile device loses communication with the licensing server or the device requiring licensing authentication.

As used herein, the term "authentication" is used to refer to proof of identity and/or proof of permission, unless otherwise specified or required by the context. Thus, reference to an "authentication message" should be interpreted to include either or both of a message used as part of an identity confirmation process, and/or a message used as part of a permissions confirmation process Additionally, the terms "licensing server," "authentication server," and derivatives thereof are used interchangeably to refer to a server that provides, among other things, authentication of licenses, licensing approvals, authentication of identity, and other services used in confirming identity of users, devices, application programs, or media items, and in confirming permissions associated with users, devices, application programs or media items.

The terms "application client," "client computer," and similar terms refer to applications, computing devices, or the like that require licensing verifications to allow full or partial functionality or access, unless otherwise specified or another meaning is clearly intended by the context.

The term "computer" as used herein refers to a processing device, and can include tablets, smart phones, server machines, desktops, laptops, televisions, radios, wearable devices or other devices that provide computer-type processing functionality.

Figure 1:
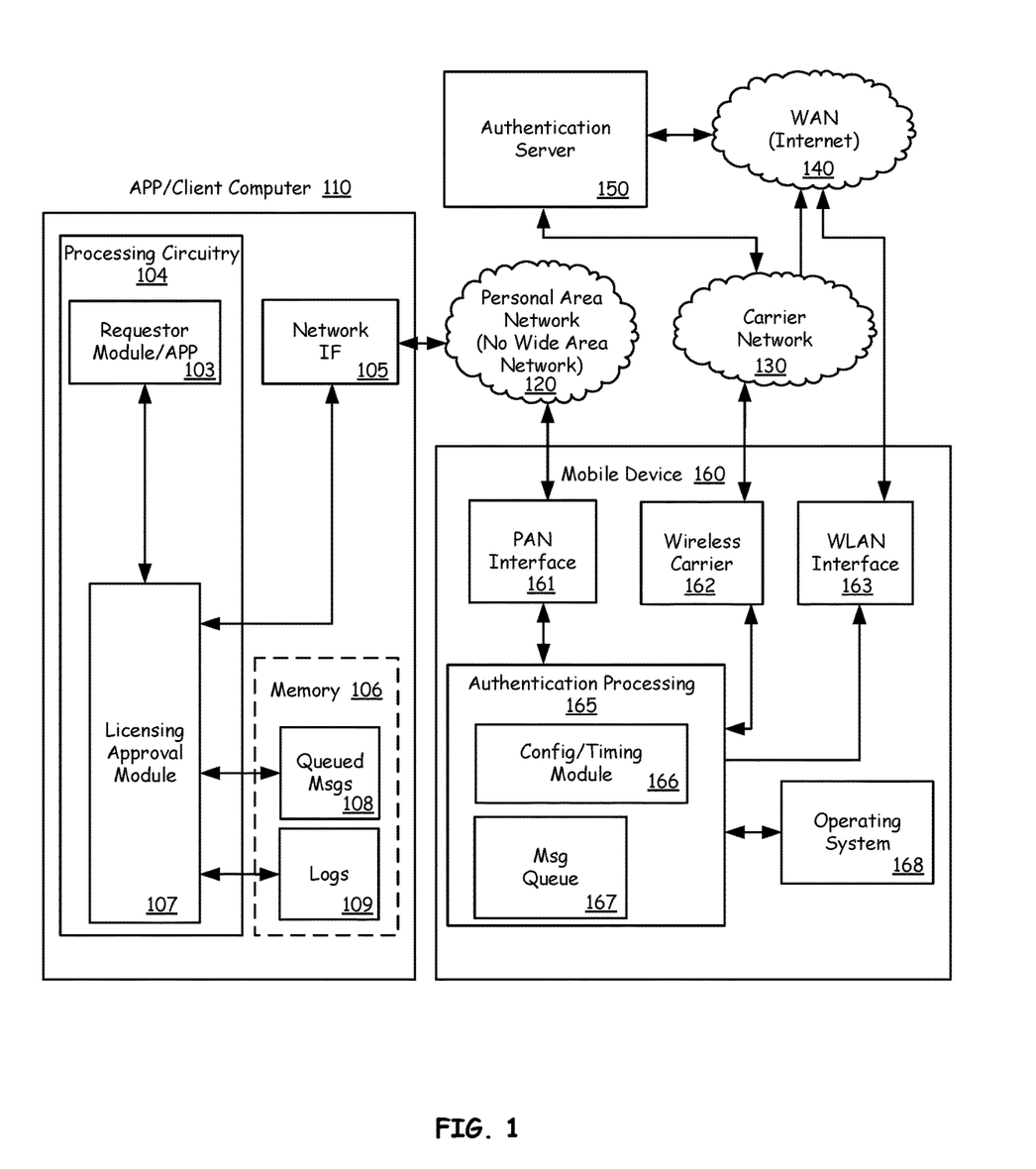
FIG. 1 is a schematic block diagram illustrating an authentication system, in accordance with various embodiments of the present disclosure.

Referring first to FIG. 1 an authentication system will be discussed in accordance with various embodiments of the present disclosure. System 100 includes client 110, mobile device 160, authentication server 150, one or more networks, such as carrier network 130 and Wide Area Network (WAN) 140, which allow mobile device 160 to communicate with authentication server 150, and a personal area network (PAN) 120, through which client 110 and mobile device 160 can communicate.

Various embodiments of client 110, which can be implemented as a hardware processing device, such as a tablet, a laptop, an application running on a processing device, or a combination of hardware and software elements, can include processing circuitry 104, network interface 105, and memory 106. Processing circuitry 104 can implement requestor module 103 and licensing approval module 107, while memory 106 can be used to store queued messages 108 and logs 109 used by licensing approval module 107. Network interface 105 can be a dedicated PAN interface configured to communicate via Bluetooth® or using another PAN protocol.

In some embodiments, network interface 105 can be a wireless interface (not explicitly illustrated) that includes hardware and software capable of communicating via a Wireless Local Access Network (WLAN). The presence of WLAN capable hardware does not mean that a WLAN connection to the Internet is available, or if available enabled or permitted, so even client 110 includes WLAN capabilities, communication with authentication server 150 via mobile device may still be preferred, for example to provide an added layer of control or security. For example, mobile device 160 can be required in some implementations for physical security purposes, where proximity of mobile device 160 to client 110 is required for client 110 to provide a desired level of functionality.

Mobile device 160 can include personal area network (PAN) interface 161, wireless carrier interface 162, WLAN interface 163, authentication processing 165, which can include a configuration/timing module 166 and message queue 167, and processing circuitry implementing an operating system 168, such as Apple® iOS, Android™, or Windows®.

In operation, requestor module 103 can determine that licensing authentication is to be requested in conjunction with performing a desired function, such as running a particular software program, displaying a media item, or providing access to other hardware or software functionality to which access is restricted or otherwise limited subject to licensing authentication. Although a single requestor module 103 is illustrated, various embodiments can include multiple requestor modules (not explicitly illustrated) associated with multiple different applications, data types, or users. Requestor module 103 can send and receive one or more messages to and from licensing approval module 107, where at least one of the messages indicates that licensing approval module 107 should request licensing authentication from authentication server 150.

In various embodiments, the messages can include authentication information such as the identity of requestor module 103; a type of requested licensing authentication, for example media playout permissions, desired media playout quality, general program access, specific program feature access, a level of program functionality requested; user authentication information associated with a user of client 110 or a user of requestor module 103, for example passwords, user names, authorization codes, or the like; device-level authentication and security information associated with client 110; requestor module authentication information; time-of-request information; or time-of-requested-access information. Messages transmitted between requestor module 103 and licensing approval module 107 can be encrypted, protected using various physical security measures to prevent unauthorized access to the messages, or some combination thereof. For example, client 110 can be implemented as an HDCP (High-bandwidth Digital Content Protection) compliant device.

Licensing approval module 107 can, in various embodiments, receive a request for licensing authentication from requestor module 103 at any point in time. In some cases, additional information can be provided by requestor module 103 at the same time as the initial request for licensing authentication by including the additional information in the same message, or by sending multiple messages. In other embodiments, requestor module 103 sends an initial request, and waits for a response from licensing approval module 107 before sending authentication information required by authentication server 150.

In some implementations, licensing approval module 107 stores messages received from requestor module 103 in queued messages 108, and stores an entry in logs 109 indicating receipt of the messages. In some embodiments, memory 106 storing the queued messages 108 and logs 109 are encrypted. Licensing approval module 107 can also store entries for all received and transmitted messages in logs 109. Logs 109 can include information about message size, date and time of transmission/receipt, success or failure of delivery to mobile device 160, data relating to the integrity or authenticity of the message (e.g., checksums) and when responses are returned from mobile device 160. In some instances all messages to and from requestor module 103 can be stored in queued messages 108. However, in other embodiments messages to or from requestor module 103 are stored in queued messages 108 if communications with mobile device 160 are not currently active, or if a licensing message window is not currently open. Thus, for example, requestor module 103 can transmit a request for licensing authentication to licensing approval module 107, and if licensing approval module 107 determines that the message cannot be delivered to mobile device 160, the message can be stored in queued messages 108 until the message can be delivered. In some embodiments, messages stored in queued messages 108 expire after expiration of a time expiration threshold, in which case the messages can be deleted from the queue. In some instances, licensing approval module 107 can notify requestor module 103 of the expiration of a message stored in queued messages 108.

If licensing approval module 107 receives a request for licensing authorization from requestor module 103, and client 110 is in communication with mobile device 160 via PAN 120, licensing approval module 107 can attempt to transmit the request for licensing authorization to mobile device via network interface 105. Note that the request can, in some embodiments, be encapsulated and forwarded with its original content, or licensing approval module 107 can generate a new request using information included in one or more messages received from requestor module 103. In implementations where licensing approval module 107 generates messages for transmission, the message generated by licensing approval module 107 can be stored in queued messages 108 in addition to, or in place of, the message received from requestor module 103.

Licensing approval module 107 can also receive licensing responses delivered to mobile device 160 from authentication server 150 in response to licensing authentication messages from requestor module 103. For example, as described in more detail later, a licensing authentication request can transmitted from client 110 to mobile device 160 via PAN 120. Mobile device 160 can deliver the licensing authentication request to authentication server 150 via carrier network 130 or WAN 140. Authentication server 150 processes the request and returns the licensing response to mobile device 160 via carrier network 130 or WAN 140. Mobile device 160 can then provide the licensing response, which was received from authentication server 150, to client 110 via PAN 120.

Licensing approval module 107 can send the licensing responses to requestor module 103, and receive return codes from requestor module 103 indicating success or failure. Response codes received from requestor module 103 can be forwarded to mobile device 160.

One or more communication channels between mobile device 160 and client 110 can be automatically established via PAN 120 whenever mobile device 160 comes within a proximity threshold of client 110. In some embodiments, communication can be established using a conventional Bluetooth® pairing process, while other implementations can use challenge/answer, passwords, keys, or other known authentication methods before allowing communication to be established.

Mobile device 160 can receive a licensing request message from client 110 via PAN interface 161, and deliver the message to authentication processing 165. Security measures similar to those used by client 110 to encrypt or otherwise protect data can be used by mobile device 160, and mobile device 160 can be an HDCP compliant device. In some embodiments authentication processing circuitry can be separate from, and operate independently of, operating system 168, while in other embodiments part or all of authentication processing 165 can be implemented as an application running under at least partial control of operating system 168.

Authentication processing 165 can use configuration/timing module 166 to determine whether a licensing message window is currently open, and consequently whether the licensing authentication request received from client 110 should accepted or not. In various embodiments, even if communication has been established mobile device 160 and client 110, the licensing message window may be closed, so the licensing message may be rejected by authentication processing 165. Additionally, in some embodiments, even though communications have been established, mobile device 160 may be outside of a proximity threshold from client 110, so licensing messages may not be accepted until mobile device 160 is within the proximity threshold.

Configuration/Timing module 166 can be used to configure when the licensing message window opens, how often the window opens, how long the window stays open, when the window closes or the like. Configuration/Timing module 166 can also be used to configure connection parameters that specify when or how often a connection to client 110 should be attempted, to configure the proximity threshold, and the like.

If authentication processing 165 accepts a message from client 110, but cannot deliver the request to authentication server 150, for example because of network connectivity issues, the request from client 110 can be stored in message queue 167 until communication with authentication server 150 can be established. Messages stored in message queue 167 can be flagged with a time-to-live marker to facilitate removal of stale or outdated messages.

If mobile device 160 can communicate with client 110 via PAN 120, and with authentication server 150 via either carrier network 130 or Wide Area Network 140, authentication processing 165 can act as an intermediary between client 110 and authentication server 150. This can be useful in cases where, for example, client 110 does not have Internet connectivity, or Internet access available to client 110 is restricted for security reasons. For example, in an enterprise environment, machines operating on sensitive data may be prevented from general Internet access, but specially provided mobile devices can be used to provide a secure, alternate path for communication with authentication server 150.

Figure 2:
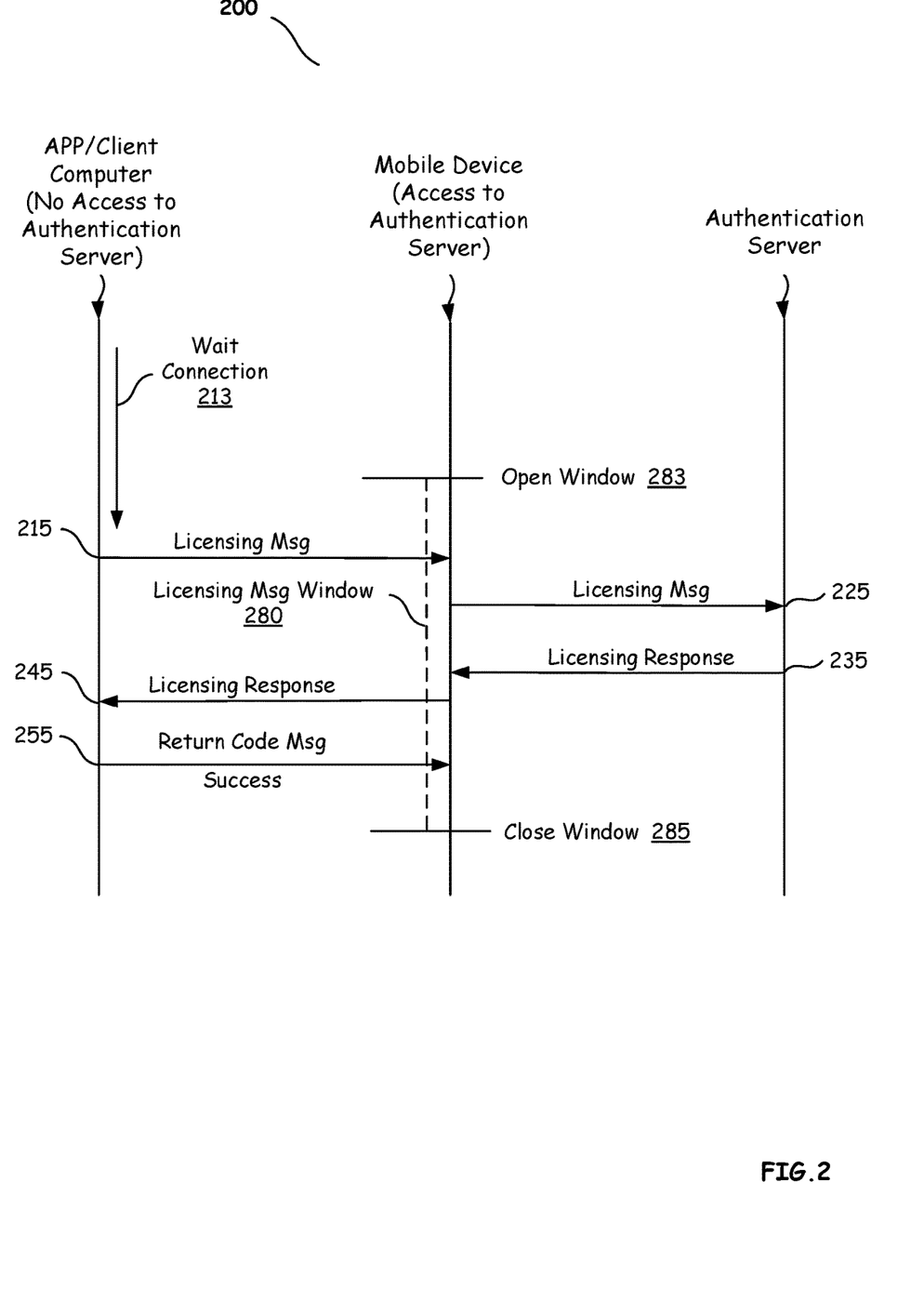
FIG. 2-4 are a message flow diagrams illustrating communications between an authentication server and a client computer, in accordance with various embodiments of the present disclosure.

Referring next to FIG. 2, system 200 shows licensing message flow between a client requesting licensing authentication and an authentication server via an intermediary mobile device is discussed according to various embodiments. In the illustrated message flow, the requesting client does not have communication access to the authentication server, and waits for a connection 213 to the intermediary mobile device prior to transmitting licensing messages 215. In various implementations of the illustrated embodiment, waiting for a connection 213 can include waiting for an open window event 283 to open licensing message window 280.

The requesting client can determine when communication has been established, including when an open window event 283 has occurred, based on completion of a pairing process via a PAN interface, based on the response or lack of response to connectivity queries initiated by the client, based on "ready" signals receive from an authentication application running on the mobile device, or some combination thereof.

In the illustrated embodiment, the client sends licensing message 215 to the mobile device via a PAN during the licensing message window, and the mobile device transmits licensing message 225 to the authentication server via a carrier network or a WAN. Licensing message 225 can include the original payload that was transmitted in licensing message 215, or the mobile device can modify the payload before generate licensing message 225.

Licensing messages 215 and 225 can include information used to identify the requesting client, a device associated with the requesting client, or a user of the requesting client. Licensing messages 215 and 225 can also include licensing information such as keys, passwords, usernames, serial numbers, contract numbers, activation keys, request dates, requests times, service/functionality type identifiers, media type identifiers, counters, or similar information that the authentication server can use to verify permissions and provide authorization or authentication. In some implementations, licensing message 215 provides licensing information related to the requesting client, while licensing message 225 includes licensing information related to both the requesting client and the mobile device. In other embodiments, licensing message 215 can also include information identifying the mobile device that the requesting client believes it is communicating with. The authentication server can use the information from the requesting client to verify the licensing information provided by the mobile device, thereby providing enhanced security.

The authentication server processes licensing message 225, generates a licensing response 235, and transmits licensing response 235 back to the mobile device via a WAN or a carrier network. The mobile device then transmits licensing response 245 to the requesting client. Licensing response 245 can, in various embodiments, include the same payload as licensing response 235. However, in some embodiments, the mobile device can modify the payload of licensing response 235 to generate licensing response 245.

In response to receiving licensing response 245, the requesting client can transmit a return code message 255, indicating successful completion of the licensing authorization process. Upon receiving return code message 255, the mobile device can initiate a close window event 285, thereby closing the licensing message window 280. In various embodiments, licensing message window 280 will remain closed until a next-scheduled open window event 283.

Figure 3:
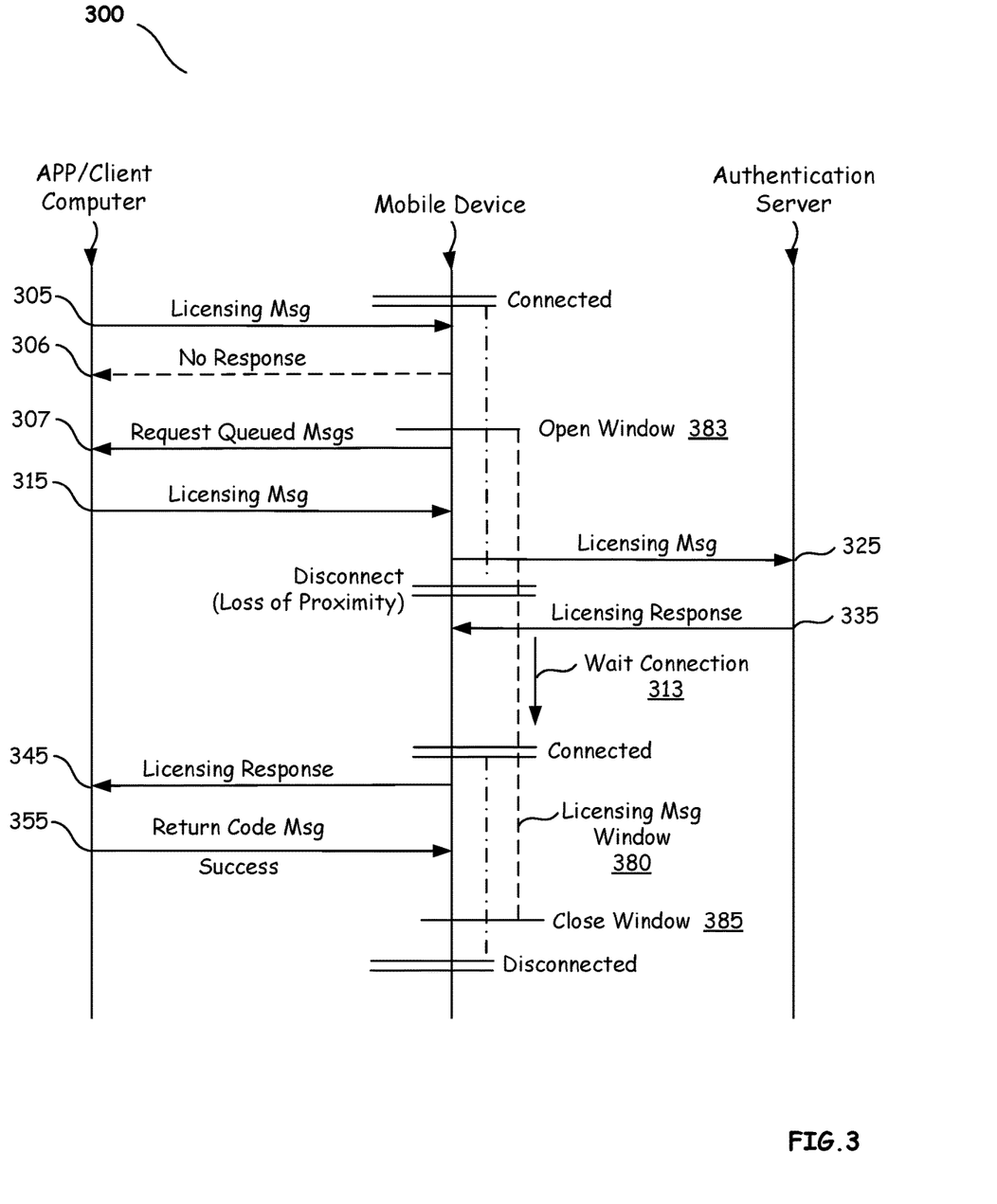

Referring next to FIG. 3, system 300 shows another licensing message flow between a client requesting licensing authentication and an authentication server via an intermediary mobile device is discussed according to various embodiments. In the illustrated message flow, a client computer can attempt to initiate a licensing authorization process by sending a licensing message 305 to a mobile device during a time when the client computer and the mobile device have been connected, but a licensing message window 380 has not yet been opened. Because licensing message window 380 is not open at the time the mobile device receives licensing message 305, mobile device can ignore or discard licensing message 305, and the client computer can register a no response event 306. In the illustrated embodiment, the client computer places licensing message 305 in a queue, and waits for an indication from the mobile device that the license messaging window 380 has opened.

An open window event 383 occurs as scheduled, and opens the licensing message window 380. The client computer sends a request for queued messages 307 to the client computer, and the client computer transmits licensing message 315 to the mobile device. Licensing message 315 can be the exact same message as licensing message 305, or it can be a modified version of licensing message 305. For example, licensing message 315 can include modified time or date information, or data relating to the attempted number of times a previous licensing message was sent. The mobile device can then forward licensing message 315 to an authentication server as licensing message 325. The authentication server can process licensing message 325 and can return licensing response 335 to the mobile device, for delivery to the client device.

However, in the illustrated example, prior to receiving licensing response 335 from the authentication server, the mobile device may travel outside of a proximity threshold from the client device, and communications between the mobile device and the client device can be disconnected. Because the licensing message window 380 is still open, the mobile device can store licensing response 335 in a queue, and wait 313 for the mobile device and the client device to be reconnected.

Once the mobile device and the client device are reconnected, the mobile device can retrieve licensing response 335 from the queue, and transmit licensing response 345 to the client computer. Note that in some embodiments, if the licensing message window closed before mobile device and the client computer were reconnected, the mobile device could discard any queued licensing response messages.

In response to receiving licensing response message 345, the client computer can send a return code message 355 indicating successful completion of the licensing authorization process. The mobile device can receive the return code message 355, and can execute a close window event 385.

As discussed above, a licensing message window can remain open until closed in response to a return code indicating success triggers closing of the window. However, the licensing message window can be configured to have a maximum open time, so that if a return code message indicating success is not received within a predetermined period of time, the window will automatically close in any case, and then only reopen at the next scheduled window open time.

Figure 4:
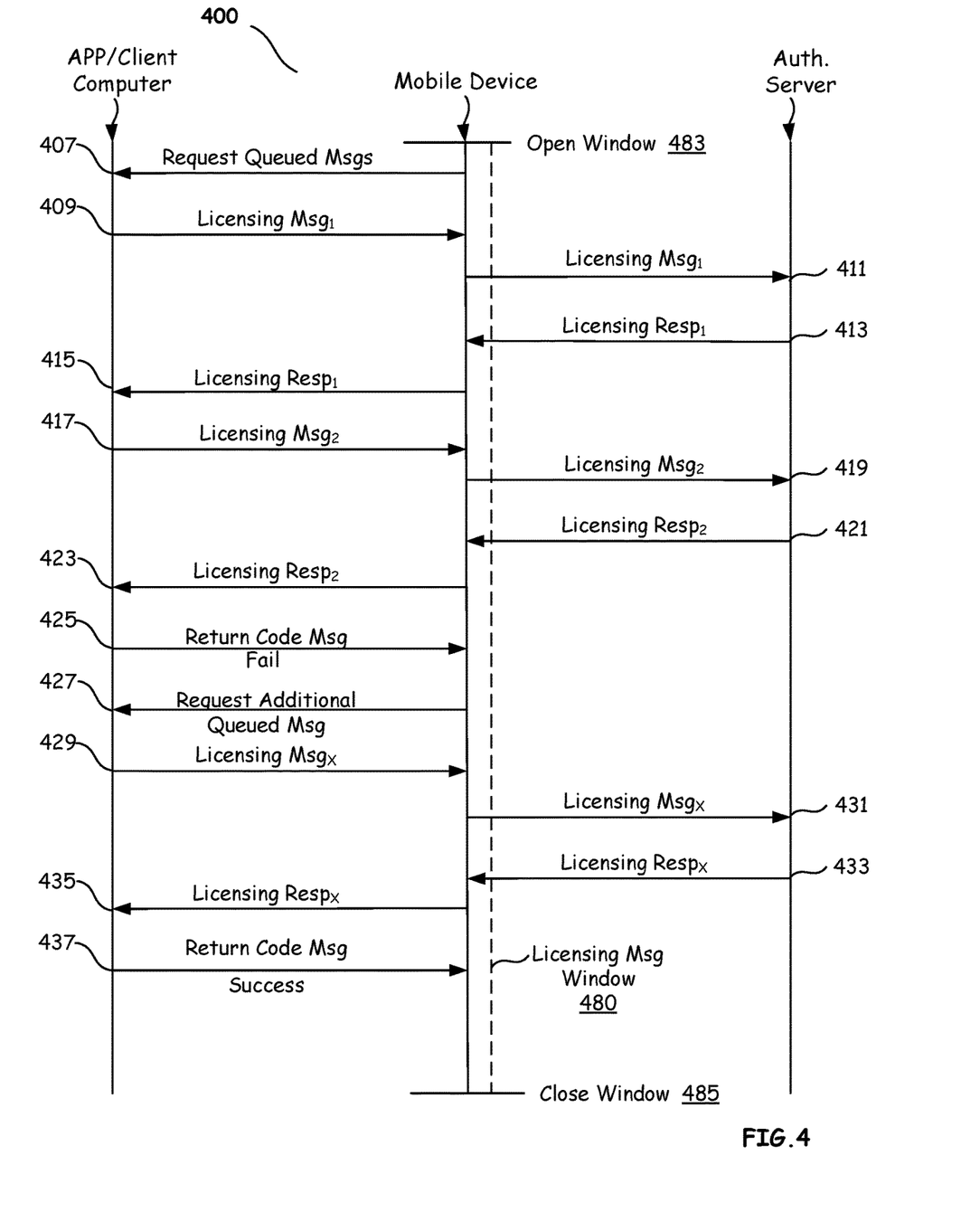

Referring next to FIG. 4, another example 400 of a licensing message flow between a client requesting licensing authentication and an authentication server via an intermediary mobile device is discussed according to various embodiments. In the illustrated message flow, an open window event 483 can occur, as previously scheduled, and can open licensing message window 480. The mobile device can transmit a request for queued messages 407 to a requesting client, and can receive a licensing message 409 in response. In the illustrated embodiment, the requesting client has queued multiple licensing messages, one or more of which may be for the same licensing authorization transaction, and others of which can be for different licensing authorization transactions. For example, one licensing authorization transaction may be related to accessing particular functionality of a software application, while another licensing authorization transaction may be related to playback or copying of a licensed media file.

The mobile device can transmit licensing message 411 to the authentication server, and the authentication server may respond by transmitting licensing response message 413 to the mobile device. The mobile device can transmit the response from the authentication server to the requesting client as licensing response message 415. In various embodiments, some or all messages forwarded by the mobile device to or from a requestor or an authentication server can be forwarded "as-is", without modifying the payload, or can be transmitted after modifying the payload. Furthermore, various message encapsulation techniques can be used to allow functionality in a virtual-private-network environment.

The mobile device then can transmit another licensing message 417 to the mobile device, the mobile device can transmit licensing message 419 to the authentication server, the authentication sever can transmit licensing response 421 back to the mobile device, and the mobile device can transmit licensing response 423 to the requesting client.

In this example there is a problem with the licensing response 423. For example, a licensing authorization request included in licensing message 417 may have been denied by the authorization server. Thus, the requesting client can send a return code message 425 indicating that the requested authorization transaction has failed. Note that in at least one embodiment, a return code indicating licensing authorization failure does not cause the mobile device to close licensing message window 480.

After receiving return code 425, the mobile device can transmit to the requesting client a request for additional queued messages 427. The mobile device can transmit any additional licensing messages 429 to the mobile device, the mobile device can transmit additional licensing messages 431 to the authentication server, the authentication sever can transmit additional licensing responses 433 back to the mobile device, and the mobile device can transmit additional licensing responses 435 to the requesting client. At this point in the example, requesting client transmits a return code message 437 indicating successful completion of the license authorization transactions, and the mobile device performs a close window event 485.

Although the message flows are described serially in the above figures, in some implementations multiple licensing messages can be transferred in a combined message between the requesting client and the mobile device, and between the mobile device and the authorization server.

Figure 5:
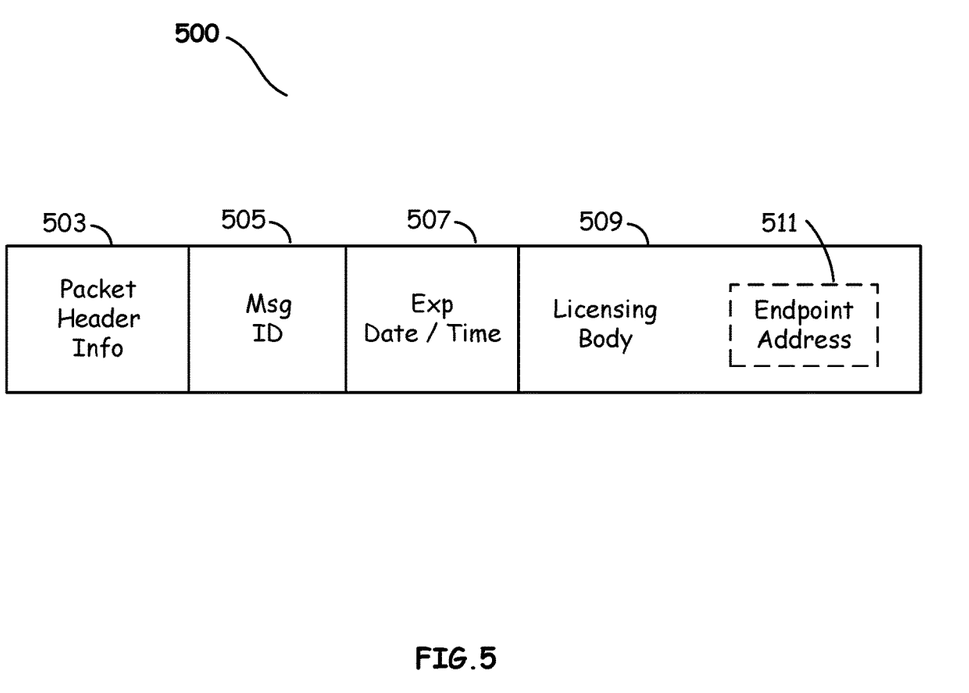
FIG. 5 is a diagram illustrating a simplified diagram of a licensing message, in accordance with various embodiments of the present disclosure.

Referring next to FIG. 5, a simplified diagram of a licensing message will be discussed according to various embodiments. Packet 500 includes, in some embodiments, packet header information 503, a message ID 505, an expiration date/time 507, and a licensing body 509. The licensing body can include an endpoint address 511. The message ID 505, expiration date/time 507, and licensing body 509 are generally considered part of the payload of packet 500.

Packet header information 503 can include information as indicated by various communication standards, including source and destination IP addresses, checksums, packet length identifiers, and the like, and may conform to one or more standards (e.g., IPv4, IPv6). Message ID 505 is an identifier that can be used to identify the message for the lifetime of the message. This ID can be recorded in log files, used to link licensing responses to licensing requests, and for similar purposes. The expiration date/time 507 can be used to expire messages that have been placed in a queue for later delivery, or to identify stale messages that should be discarded.

Licensing body 509 can include the licensing authentication information used by an authentication server, e.g. passwords, user names, registration information, access type, etc., to determine whether or not a licensing authentication request should be granted. In at least one embodiment, endpoint address 511 includes the full uniform resource locator (URL) endpoint that will accept the licensing authentication information. Thus, for example, if a client device generates a license authentication request intended for a particular authentication server, packet header 503 can include the address of the client device as the source, and the address of the mobile device as the destination, but the endpoint address 511 will be the address of the particular authentication server. The remainder of the licensing body not dedicated to endpoint address 511 can include any other information necessary for completion of a licensing authentication transaction.

Figure 6:
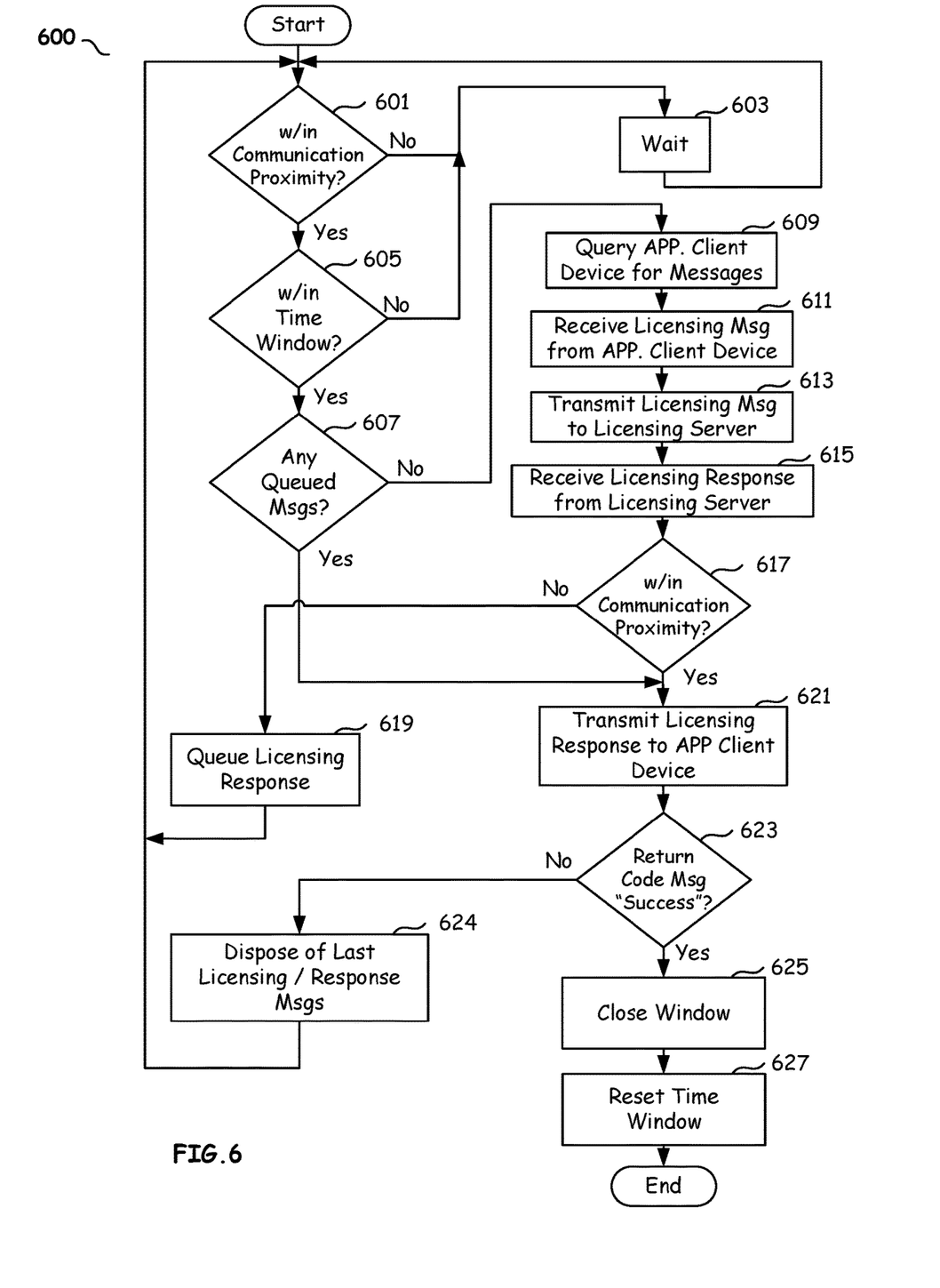
FIG. 6 is a flow diagram illustrating methods used by a mobile device to deliver licensing related messages associated with a client device, in accordance with various embodiments of the present disclosure.

Referring next to FIG. 6, a method 600, used by a mobile device to deliver licensing related messages associated with a client device, will be discussed according to various embodiments. As illustrated by block 601, a determination can be made regarding whether a mobile device is within a proximity threshold of a client device that requires licensing authentication by an authentication server. In some cases, this determination can be made independently by either or both of the mobile device and the client device based on the ability of the mobile device and the client device to communicate, or otherwise. In some embodiments, signal strength can be used as an indicator of proximity, and a signal strength threshold can be used as the proximity threshold. In other embodiments, the proximity of a mobile device to a client device can be made using motion sensors, triangulation and/or global position system (GPS) or other known techniques, including specifying a fixed location of the client device based on user input. The location of the mobile device can be compared to the location of the client device to determine whether the proximity threshold is satisfied.

If the mobile device is not within a proximity threshold to the client device, the mobile device can wait until it is close enough as illustrated by block 603. If the mobile device is within the proximity threshold to the client device, a check 605 can be made to determine whether or not a licensing message window is open. If not, the mobile device may wait until the window opens, as illustrated by block 603.

As illustrated at block 607, the mobile device may check to see if there are any queued licensing messages that are to be sent to the client device. If there are no queued messages to be sent, the mobile device queries the client device for messages, either new or queued, as illustrated by block 609. In response to receiving one or more licensing messages from the client device as shown by block 611, the mobile device may forward the licensing messages to an authentication, or licensing, server, as illustrated by block 613. Unless otherwise specified, the terms licensing server and authentication server are used interchangeably, herein. The mobile device then may receive a licensing response from the licensing server as illustrated by block 615.

At this point, another check can be made to determine if the mobile device is still within communication proximity of the client device, as illustrated by block 617. If not, the licensing response from the licensing server can be queued for later delivery, as illustrated by block 619.

If the determination at block 617 indicates that the mobile device is still within the proximity threshold to the client device, the licensing response from the server can be transmitted to the client device as illustrated by block 621. As illustrated by block 621, any queued licensing responses can also be delivered to the client device.

A check is made, as illustrated by block 623, to determine if a return code indicating successful completion of a licensing transaction has been received at the mobile device. If the response code indicates failure, or in some embodiments if no response code is received within a predetermined period of time, the licensing and response messages related to the unsuccessful licensing transaction can be discarded, as illustrated by block 624. If a return code indicating success is received at the mobile device, the mobile device closes the licensing message window, as illustrated by block 625, and can reset a window timer so that the licensing message window will open again after a desired delay, as illustrated by block 627.

Figure 7:
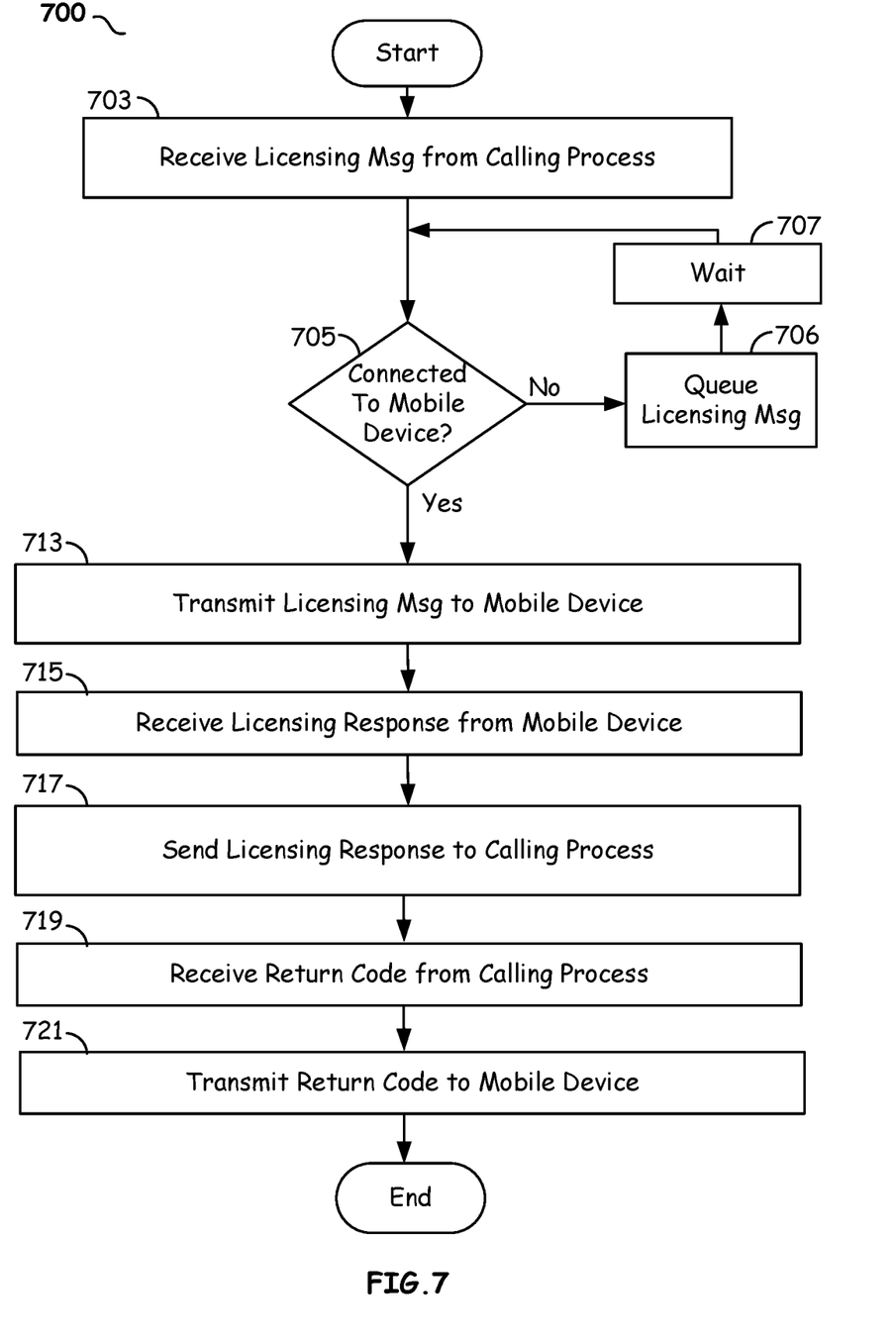
FIG. 7 is a flow diagram illustrating methods of communicating licensing related messages to an authentication server from a client device through an intermediary mobile device, in accordance with various embodiments of the present disclosure.

Referring next to FIG. 7, a method 700 of communicating licensing related messages to an authentication server from a client device through an intermediary mobile device will be discussed in accordance with various embodiments of the present disclosure. As illustrated by block 703, a licensing approval module may receive a licensing message from a calling process. For example, a software program can generate a request for authentication of a license in response to a user attempting to access a particular feature or file, in response to a user attempting to access the software program, in response to an authentication timer expiring, or in response to some other similar event. The licensing message can include a request for authentication of the client device, the user, a license to use an application, or otherwise.

As illustrated by block 705, a check is made to determine whether the client device can communicate with a mobile device, where the mobile device will communicate with an authentication or licensing server on behalf of the client device. As illustrated by block 706, if the client device is not currently in communication with the mobile device, the licensing module can temporarily store the licensing message for later delivery, and wait as illustrated by block 707 until communication has been established.

If it is determined that the client device is connected to the mobile device, the licensing message can be transmitted to the mobile device, as illustrated by block 713. As illustrated by block 715, a licensing response is received from the mobile device. This licensing response includes authentication/licensing information obtained by the mobile device from an authentication/licensing server.

The licensing response can be sent from the licensing module to the calling process, as illustrated by block 717, and the licensing process can send a return code indicating success or failure back to the licensing module, as illustrated by block 719. The licensing module can then transmit the return code, or generate a new return code and transmit the newly generated return code, to the mobile device, as illustrated by block 721.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

One or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method comprising:
   waiting, at a client device, for a licensing window to be opened by an intermediary device prior to transmitting a licensing request to the intermediary device, wherein waiting for the licensing window to be opened includes waiting for a scheduled opening of the licensing window;
   in response to determining that the licensing window is open, transmitting the licensing request to the intermediary device via a first communications network; and
   receiving a licensing response from the intermediary device via the first communications network, the licensing response reporting an approval status associated with the licensing request, wherein the approval status is included in a message transmitted from an authentication server to the intermediary device via a second communications network different from the first communications network.

2. The method of claim 1, further comprising:
   in response to receiving the licensing response, transmitting a return code message from the client device to the intermediary device via the first communications network, wherein the return code message causes the intermediary device to close the licensing window.

3. The method of claim 1, wherein waiting for the licensing window to be opened includes:
   waiting for the intermediary device to respond to a connectivity query initiated by the client device.

4. The method of claim 1, wherein waiting for the licensing window to be opened includes:
   waiting for a "ready" signal to be received from the intermediary device.

5. The method of claim 1, wherein the licensing request includes:
   information identifying the intermediary device the client device believes it is communicating with.

6. The method of claim 1, wherein the licensing response includes:
   the same payload included in the message transmitted from the authentication server to the intermediary device.

7. A computing device comprising:
   a network interface coupling the computing device to an intermediary device via a first communication network;
   processing circuitry coupled to the network interface, the processing circuitry implementing:
      a requestor module, the requestor module configured to determine that licensing authentication is to be requested in conjunction with performing a particular function; and
      a licensing approval module, the licensing approval module configured to:
         wait for a licensing window to be opened by the intermediary device prior to transmitting a licensing request to the intermediary device wherein waiting for the licensing window to be opened includes waiting for a scheduled opening of the licensing window;
         transmit the licensing request to the intermediary device, via the first communications network, in response to determining that the licensing window is open; and
         receive a licensing response from the intermediary device via the network interface, the licensing response reporting an approval status associated with the licensing request, wherein the approval status is included in a message transmitted from an authentication server to the intermediary device via a second communications network different from the first communications network.

8. The computing device of claim 7, the licensing approval module further configured to:
   transmit, in response to receiving the licensing response, a return code message to the intermediary device via the first communications network, wherein the return code message causes the intermediary device to close the licensing window.

9. The computing device of claim 7, wherein waiting for the licensing window to be opened includes:
   waiting for the intermediary device to respond to a connectivity query.

10. The computing device of claim 7, wherein waiting for the licensing window to be opened includes:
    waiting for a "ready" signal to be received from the intermediary device.

11. The computing device of claim 7, wherein the licensing request includes:
    information identifying an intended intermediary device.

12. The computing device of claim 7, wherein the licensing response includes:
    the same payload included in the message transmitted from the authentication server to the intermediary device.

13. A licensing verification system comprising:
    an application client and a mobile licensing intermediary, the application client including:
       a network interface coupling the application client to an intermediary device via a first communication network;

processing circuitry coupled to the network interface, the processing circuitry implementing:
- a requestor module, the requestor module configured to determine that licensing authentication is to be requested in conjunction with performing a particular function; and
- a licensing approval module, the licensing approval module configured to:
  - wait for a licensing window to be opened by the intermediary device prior to transmitting a licensing request to the intermediary device wherein waiting for the licensing window to be opened includes waiting for a scheduled opening of the licensing window;
  - transmit the licensing request to the intermediary device, via the first communications network, in response to determining that the licensing window is open;

the mobile licensing intermediary including:
- authentication processing circuitry configured to:
  - receive the licensing request;
  - transmit, to an authentication server, a licensing message associated with the licensing request;
  - receive a first licensing response message from the authentication server;
  - transmit a second licensing response message to the application client; and
  - the licensing approval module further configured to receive the second licensing response message from the intermediary device.

14. The licensing verification system of claim 13, wherein:
the licensing approval module is further configured to:
transmit, in response to receiving the second licensing response message, a return code message to the intermediary device via the first communications network; and
the intermediary device closes the licensing window in response to receiving the return code message.

15. The licensing verification system of claim 13, wherein waiting for the licensing window to be opened includes:
waiting for the intermediary device to respond to a connectivity query.

16. The licensing verification system of claim 13, wherein waiting for the licensing window to be opened includes:
waiting for a "ready" signal to be received from the intermediary device.

17. The licensing verification system of claim 13, wherein the licensing request includes:
information identifying an intended intermediary device.

18. The licensing verification system of claim 13, wherein the second licensing response message includes:
the same payload included in the first licensing response message transmitted from the authentication server to the intermediary device.

* * * * *